R. T. Sargent,
Mirror.
No. 113,100. Patented Mar. 28, 1871.

Witnesses
L. N. Piper.
L. N. Miller.

R. T. Sargent
by his attorney
N. M. Cobb

United States Patent Office.

RANSOM TRUMAN SARGENT, OF NORWICH, VERMONT.

Letters Patent No. 113,100, dated March 28, 1871.

IMPROVEMENT IN SUSPENSION TOILET-MIRRORS.

The Schedule referred to in these Letters Patent and making part of the same.

*To all persons to whom these presents may come:*

Be it known that I, RANSOM TRUMAN SARGENT, of Norwich, of the county of Windsor and State of Vermont, have invented a new and useful Suspension Toilet-Mirror; and do hereby declare the same to be fully described in the following specification and represented in the accompanying drawing, of which—

Figure 1:
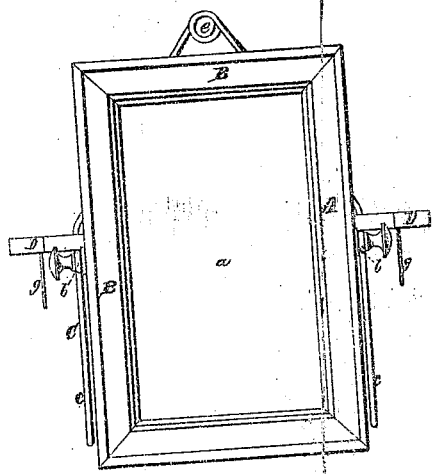
Figure 3:
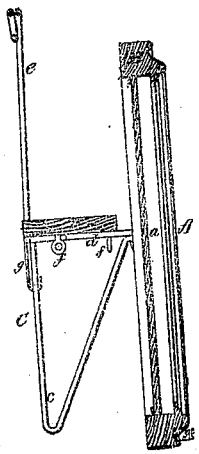
Figure 2:
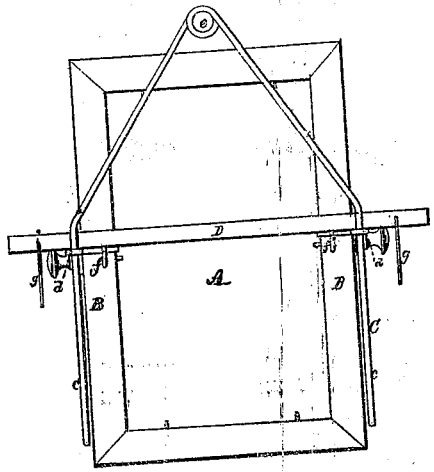
Figure 4:
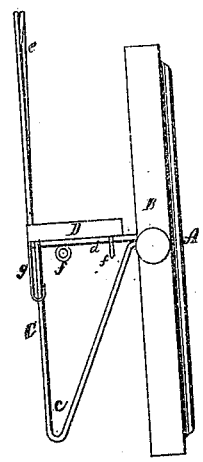

Figure 1 is a front elevation;
Figure 2, a rear view;
Figure 3, a vertical section; and
Figure 4, an end elevation of it.

The nature of the said invention consists in the combination of a mirror and a suspension and supporting-frame of a peculiar character or kind; also, in such a mirror and a shelf and such a frame combined, and arranged in manner substantially as hereinafter explained, the whole forming a convenient mirror and stand for use upon a table, or a bureau, or to hang against a wall or partition.

In the drawing—

A denotes an ordinary mirror or sheet of looking-glass, *a,* and its frame B, the mirror being rectangular in form.

At the middle of the opposite edges of the frame such mirror is pivoted to the arms *b b* of a frame, C, made of wire, bent in manner as represented, so as to form two supports or legs, *c c,* two shelf-rests, *d d,* and a suspension-bail, *e,* all being arranged as set forth.

On the two rest *d d* a shelf, D, is arranged, and fastened thereto by screws *f f.*

If desirable, one or more hooks, *g g,* may be projected from the shelf, as represented, such serving as hangers for brushes, towels, or other articles of toilet.

When the toilet apparatus is placed on a table the lower edge of the mirror-frame and the feet of the legs of the frame rest on the table, the mirror being upright or inclined, its extent of inclination being limited by the shelf.

When the apparatus is applied to the side of a room the eye of the bail is to be placed on a nail, hook, or stud projected from the said side.

I claim—

1. The combination of the mirror and the supporting-frame, made and connected together as set forth.

2. The combination of the mirror, the shelf, and the supporting-frame, as constructed, connected, and arranged substantially as specified.

RANSOM T. SARGENT.

Witnesses:
R. H. EDDY,
J. R. SNOW.